United States Patent [19]

Ono

[11] Patent Number: 5,295,013
[45] Date of Patent: Mar. 15, 1994

[54] OPTICAL RECEIVER OF DIRECT DETECTION TYPE

[75] Inventor: Takashi Ono, Tokyo, Japan

[73] Assignee: NEC Corporation, Tokyo, Japan

[21] Appl. No.: 35,167

[22] Filed: Mar. 22, 1993

[30] Foreign Application Priority Data

Mar. 23, 1992 [JP] Japan .................. 4-064325

[51] Int. Cl.⁵ .................................. H04B 10/06
[52] U.S. Cl. .................................. 359/192; 359/122;
359/156; 359/134; 359/160; 359/189
[58] Field of Search ........... 359/124, 156, 122, 160,
359/134, 182-183, 188, 189, 192-195

[56] References Cited

U.S. PATENT DOCUMENTS

| | | | |
|---|---|---|---|
| 4,856,093 | 8/1989 | Mohr | 359/181 |
| 4,989,200 | 1/1991 | Olshansky et al. | 359/192 |
| 5,052,051 | 9/1991 | Naito et al. | 359/192 |
| 5,191,457 | 3/1993 | Yamazaki | 359/124 |

FOREIGN PATENT DOCUMENTS 0052530 3/1988 Japan .................. 359/183

Primary Examiner—Richard E. Chilcot, Jr.
Assistant Examiner—Kinfe-Michael Negash
Attorney, Agent, or Firm—Sughrue, Mion, Zinn, Macpeak & Seas

[57] ABSTRACT

An optical receiver according to the present invention is used for detecting FSK or PSK signal light directly. The receiver has a PM fiber and a peak detector. The peak detector detects an amplitude of a demodulated output signal. In accordance with an output signal of the peak detector, a polarization condition of a signal light to be supplied to the PM fiber is controlled so as to keep the output of the peak detector maximum.

9 Claims, 4 Drawing Sheets

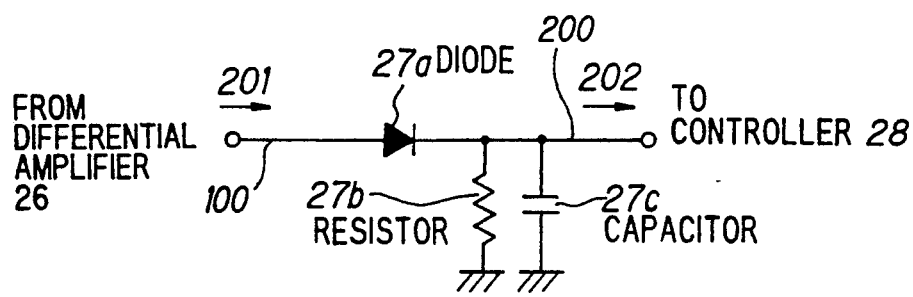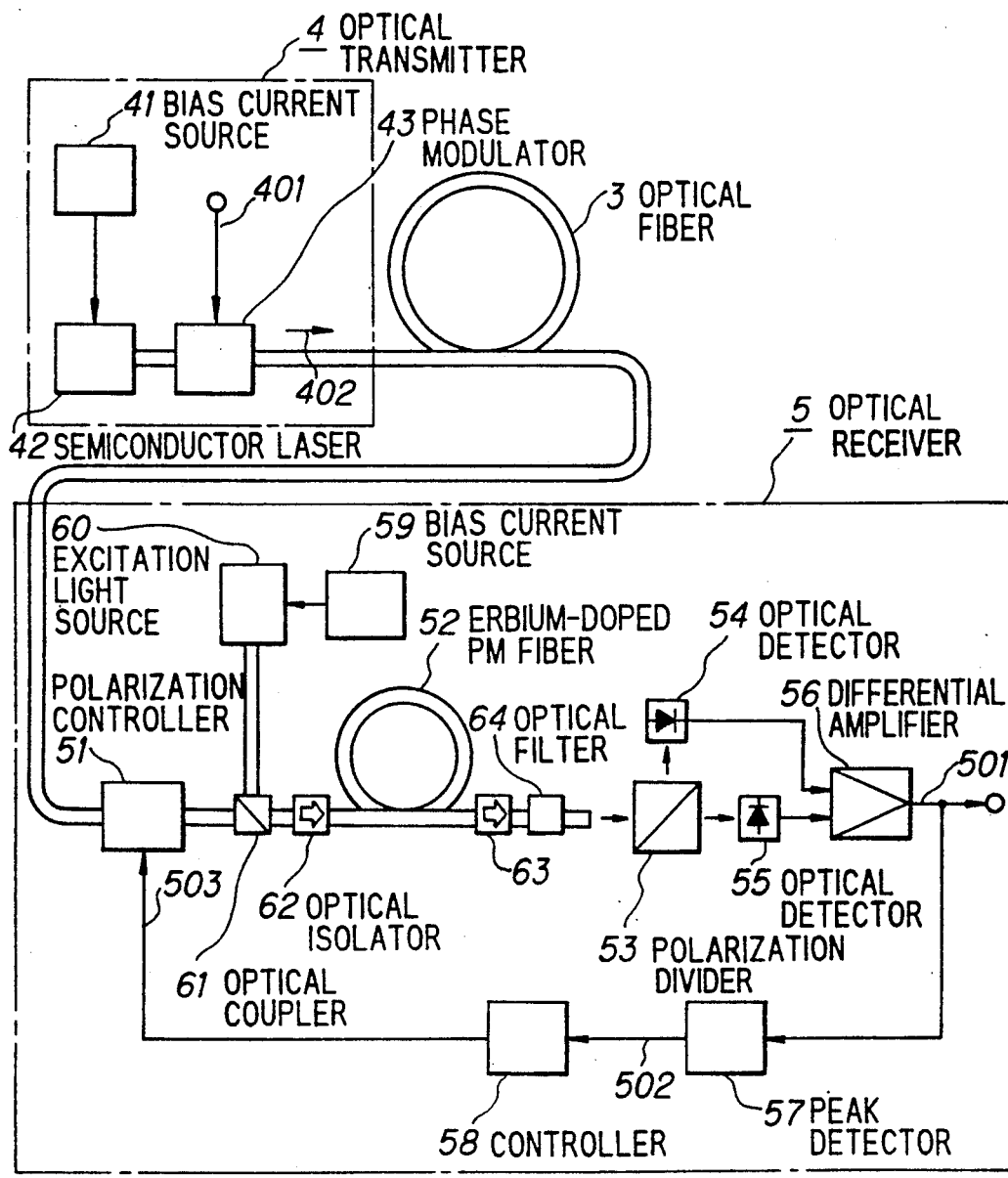

OPTICAL RECEIVER OF DIRECT DETECTION TYPE

FIELD OF THE INVENTION

This invention relates to an optical receiver of a direct detection type, and more particularly, to an optical receiver of a direct detection type for receiving a signal light modulated by an optical FSK (frequency shift keying) method or an optical PSK (phase shift keying) method.

BACKGROUND OF THE INVENTION

An optical communication system includes an optical transmitter for transmitting a signal light, an optical receiver for receiving the signal light from the optical transmitter, and an optical fiber for connecting the optical transmitter and the optical receiver. In such an optical communication system using a direct detection method, the optical transmitter is provided with a modulator for modulating a bias current in accordance with a data signal to provide a signal light (transmission light). On the other hand, the optical receiver is provided with a demodulator for demodulating a received signal light to reproduce the data signal.

Recently, in such an optical communication system, an optical FSK (frequency shift keying) and an optical PSK (phase shift keying) have been used as a signal modulating method. In a situation that FSK or PSK is used in an optical communication system, a heterodyne detection method can be also used for receiving a transmission light as well as a direct detection method.

According to an optical receiver using a heterodyne detection method, a wide bandwidth is required for receiver circuit. On the other hand, according to optical transmitter and receiver using a direct detection method, a signal light is directly modulated by a baseband signal and the baseband signal is directly detected, so that a high bit rate transmission can be carried out easily.

The optical receiver of a direct detection type includes an optical frequency discriminator or an optical phase discriminator to detect an FSK signal light and a PSK signal light.

One of optical frequency discriminators has been described on pages 376 to 377 in a "Electronics Letters", Vol. 26, No. 6, 1990. According to the letter, a signal light is demodulated in accordance with a transmission characteristics of a Mach-Zehnder interferometer. In this case, the interferometer is required to have a center frequency which is coincided with that of the signal light in order to increase a detection efficiency thereof. For the purpose of controlling the frequency of the interferometer, one of two waveguides of glass ($SiO_2$) is heated by a heater to be adjusted in phase.

According to the conventional optical receiver, however, there are disadvantages in that a frequency of the interferometer is difficult to be coincided with the center frequency of the signal light at high speed, because the frequency of the interferometer is controlled by heating process. As a result, a detection efficiency is not stable sufficiently. Further, a receiving sensitivity of the conventional receiver is low.

Otherwise, an optical frequency discriminator for demodulating a signal light in accordance with a propagation delay-time difference between two intrinsic optical axes (principal optical states) of a PM (polarization maintaining) fiber has been described in a report, R. S. Vodhanel, "Frequency modulation response measurements to 15 GHz using a novel birefringent fiber interferometer", Tech. Dig. Topical Meeting Opt. Fiber Commun., pager WQ13, 1989. The frequency discriminator performs the same operation as the Mach-Zehnder interferometer as described above.

SUMMARY OF THE INVENTION

Accordingly, it is an object of the invention to provide an optical receiver of a direct detection type in which a detection efficiency is stable at any time.

It is another object of the invention to provide an optical receiver of a direct detection type in which the receiving sensitivity is high.

According to the invention, an optical receiver of a direct detection type includes:

a polarization controller for controlling polarizations of an input signal light modulated by an optical FSK (frequency shift keying) method;

a PM (polarization-maintaining) fiber for discriminating a frequency of an output light of the polarization controller;

a polarization divider for dividing an output light of the PM fiber into two orthogonal lights in polarization, the polarization divider being structured to have an optical axis having forty five degrees to the two intrinsic optical axes (principal optical states) of the output light of the PM fiber;

means for demodulating at least one of two output lights of the polarization divider to provide the signal light;

means for detecting an amplitude of the demodulated signal light; and a controller for controlling the polarization controller in accordance with an output of the amplitude detecting means so that the output of the amplitude detecting means is controlled to have maximum value.

The other objects and features of the invention will become understood from the following description with reference to the accompanying drawings.

BRIEF DESCRIPTION OF THE DRAWINGS

FIG. 2 is a circuit diagram showing a peak detector used in the first preferred embodiment shown in FIG. 1;

FIG. 6 is a block diagram showing an optical transmission system using an optical receiver of a third preferred embodiment according to the invention.

DESCRIPTION OF THE PREFERRED EMBODIMENTS

Figure 1:
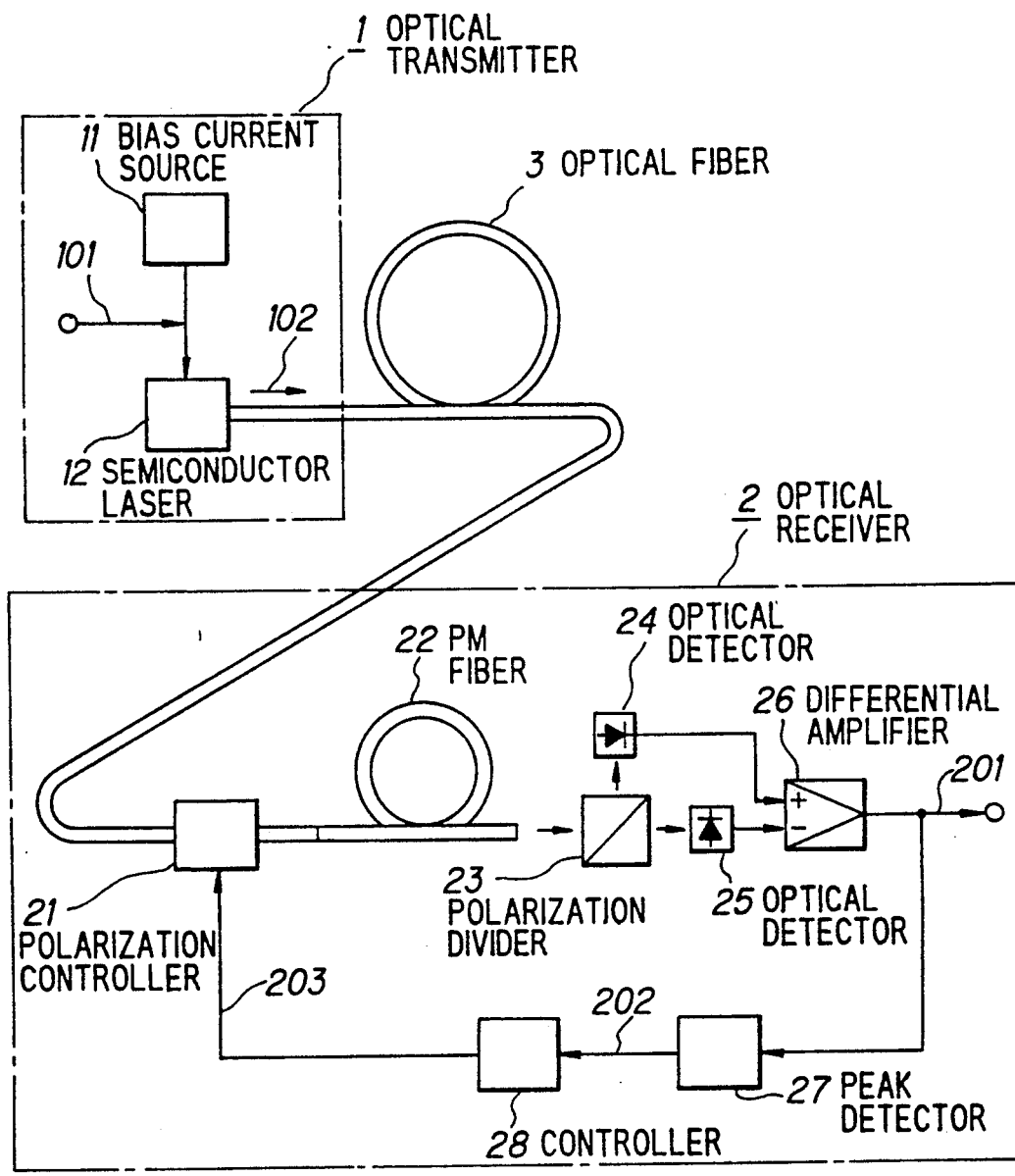
FIG. 1 is a block diagram showing an optical transmission system using an optical receiver of a first preferred embodiment according to the invention.

FIG. 1 shows an optical transmission system, which includes an optical transmitter 1 of a direct modulation type, and an optical receiver 2 of a direct detection type of a first preferred embodiment according to the invention. The optical transmission system is of an optical FSK (frequency shift keying) type.

The optical transmitter 1 includes a bias current source 11 for generating bias current of 100 mA and a semiconductor laser 12 for emitting a laser light having a wavelength of 1.5 μm. The semiconductor laser 12 is shifted in frequency in accordance with an injection current which is obtained by the addition of a digital electric signal to a current supplied from the bias current source 11. The digital electric signal 101 is of 2.5 Gb/s, and has an amplitude to set the frequency shift of the semiconductor laser 12 to be 2 GHz.

Thus, in the optical transmitter 1, an FSK (frequency shift keying) signal 102 is generated by modulating a bias current from the bias current source 11 in accordance with the digital electric signal 101. The FSK signal 102 is transmitted through an optical fiber 3 to the optical receiver 2.

The optical receiver 2 includes a polarization controller 21 connected to the optical fiber 3, a PM (polarization maintaining) fiber 22 connected to the polarization controller 21, a polarization divider 23 connected to the PM fiber 22, two optical detectors 24 and 25, a differential amplifier 26 connected to the optical detectors 24 and 25, a peak detector 27 connected to the differential amplifier 26, and a controller 28 connected to the peak detector 27 and the polarization controller 21.

The polarization controller 21 includes an optical fiber (not shown) connected between the optical fiber 3 and the PM fiber 22, and four piezoelectric actuators (not shown) controlled to the controller 28 for pressurizing the optical fiber from the four side directions. Detail of the polarization controller is described on pages 1217 to 1224 in a journal "JOURNAL OF LIGHTWAVE TECHNOLOGY," Vol. 9, No. 10, October 1991.

The PM fiber 22 has a propagation delay-time difference of 3 ps/m between the two intrinsic optical axes (principal optical states), which are set to be orthogonal each other. And the PM fiber 22 is specified to have a length of 83 m to provide a total propagation delay-time difference "τ" of 250 ps. A propagation delay-time difference "τ" is given by the equation "τ=T/2 m=250 (ps)", where "m" means the modulation factor of the FSK signal light (m=2 GHz/2.5 GHz=0.8) and "T" means the time slot of the digital signal 101 (T=1/2.5 GHz=400 ps).

The polarization divider 23 is determined to have an optical axis having forty five degrees to the two intrinsic optical axes of the PM fiber 22. The controller 28 includes a micro-processor for generating a control signal by receiving a peak value from the peak detector 27.

FIG. 2 shows the peak detector 27. The peak detector 27 includes a diode 27a connected at an input through an input line 100 to the differential amplifier 26 and at an output through an output line 200 to the controller 28, a resistor 27b connected between the output line 200 and ground, and a capacitor 27c connected between the output line 200 and ground.

In operation, when the digital signal 101 is applied to an injection current supplied from the bias current source 11, the injection current is modulated in accordance with the digital signal 101 to supply the FSK signal light 102 from the optical transmitter 1. The FSK signal light 102 is transmitted through the optical fiber 3 to the optical receiver 2.

When the FSK signal light 102 is supplied to the polarization controller 21, the FSK signal light 102 is controlled in polarization by the polarization controller 21 and is supplied to the PM fiber 22. In the PM fiber 22, the signal light is propagated to have a propagation delay-time difference "τ" of 250 ps between the two intrinsic optical axes thereof. The signal light is supplied from the PM fiber 22 to the polarization divider 23.

When the signal light is supplied to the polarization divider 23, the signal light is divided into two lights having orthogonal polarizations and the divided lights are supplied to the optical detectors 24 and 25, respectively. Then, the divided lights are converted to electric signals by the optical detectors 24 and 25, and the electric signals are supplied to the differential amplifier 26. Then, the electric signals are amplified by the differential amplifier 26 to supply the demodulated output signal 201.

Figure 3:
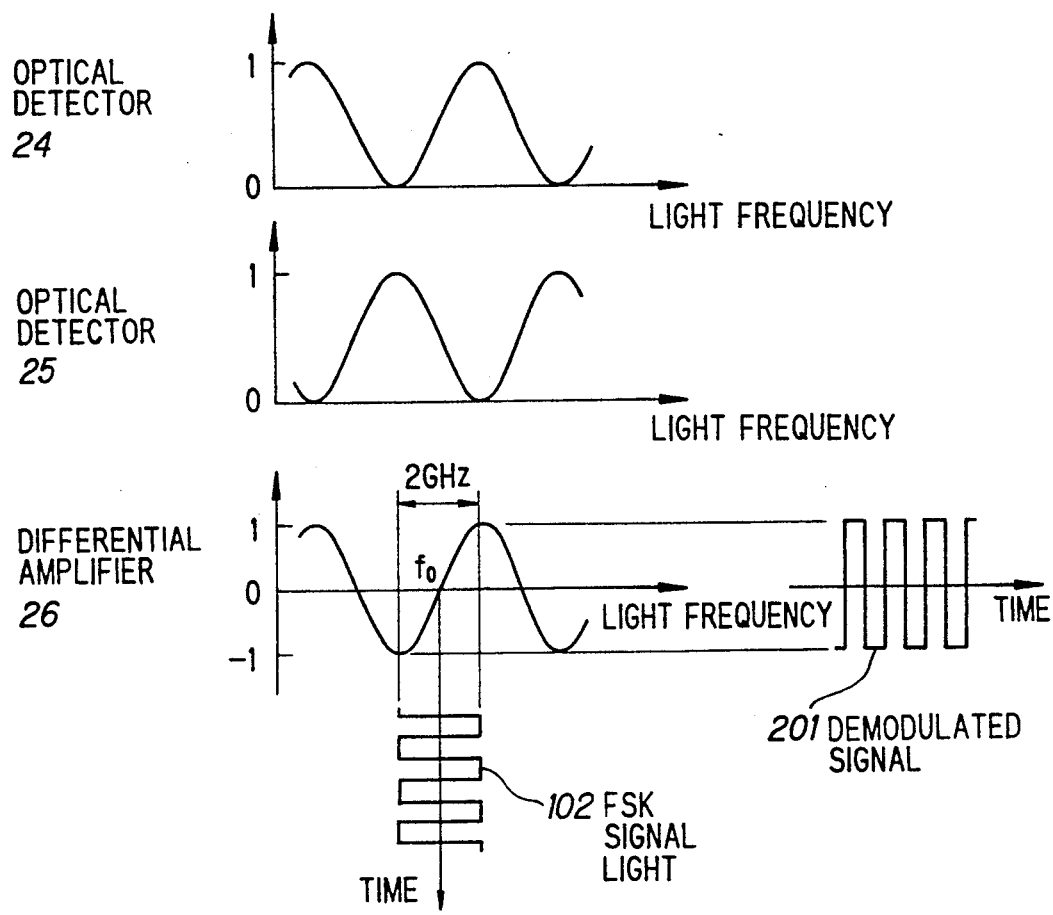
FIGS. 3 and 4 are graphs showing operation of the first preferred embodiment.

FIG. 3 shows a relation among the outputs of the optical detector 24 and 25 and the differential amplifier 26. According to the signal waveforms, it is found that the differential amplifier 26 supplies the output signal having a frequency difference of 2 GHz between top and bottom peaks thereof. And, the zero-cross point of the frequency discrimination characteristics of the receiver is coincident with the center frequency $f_o$ of the FSK signal light 102 as shown in FIG. 3.

Figure 4:
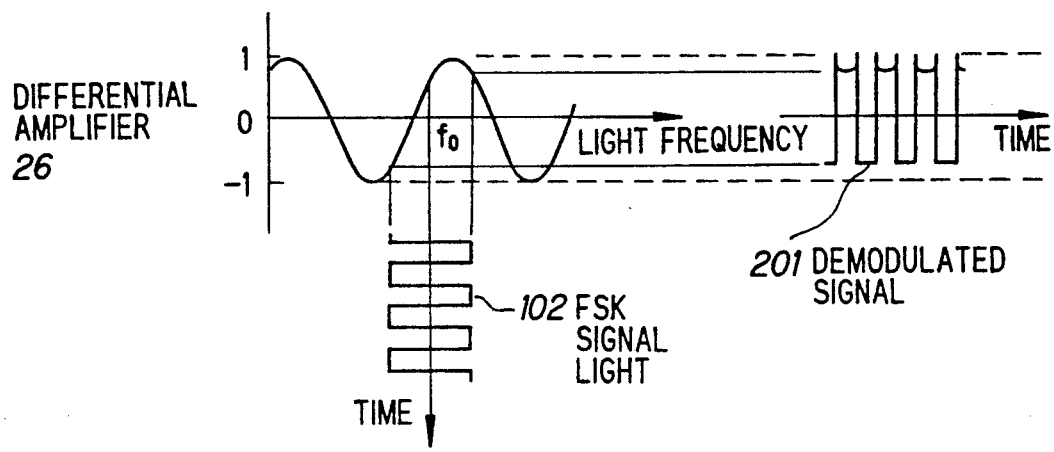

If the zero-cross point of the frequency discrimination characteristics is deviated from the center frequency $f_o$ due to temperature variation, stress of the PM fiber 22 and the like, an amplitude of the demodulated output signal 201 is decreased in amplitude as shown in FIG. 4. In this case, the frequency discrimination characteristics is controlled to be shifted along the frequency axis in the polarization controller 21.

That is, when the demodulated signal light 201 which is supplied from the differential amplifier 26 is supplied to the peak detector 27 composed of a half-wave rectifier, an electric signal 202 having a level corresponding to an amplitude of the demodulated signal 201 is generated and supplied therefrom to the controller 28. In the controller 28, a level of the electric signal 202 is compared with a reference value corresponding to a suitable amplitude for the demodulated signal 201. The controller 28 generates a control voltage 203 in accordance with the result of the comparison. In this process, a level of the control voltage 203 is controlled by a hill climbing method, that is, small perturbation is applied to the control voltage 203 so as to increase the electric signal 202 so as to be maximum.

When the control voltage 23 is supplied to the polarization controller 21, polarizing condition of the FSK signal light 102 is controlled in accordance with the control voltage 23. This process, controlling polarization, is equivalent to that of controlling a phase difference between the two intrinsic optical axes of the PM fiber 22. In response to the variation of the phase difference, the center frequency of the frequency discrimination characteristics of the receiver is shifted along the frequency axis.

According to the optical receiver 2 of the first preferred embodiment, the frequency discrimination characteristics is controlled by adjusting the polarizing condition of the input signal light 102, so that demodulating process can be carried out stably for a long time even if the ambient temperature varies. Further, the frequency discriminator is fabricated by using the PM fiber 22, so that light loss of the optical receiver 2 becomes less than 0.5 dB.

In the first preferred embodiment, if an optical amplifier (not shown) is provided at the front stage of the polarization controller 21 as a pre-amplifier, receiving sensitivity of the optical receiver 2 is more increased because thermal noise to affect the receiver 2 can be negligible.

Figure 5:
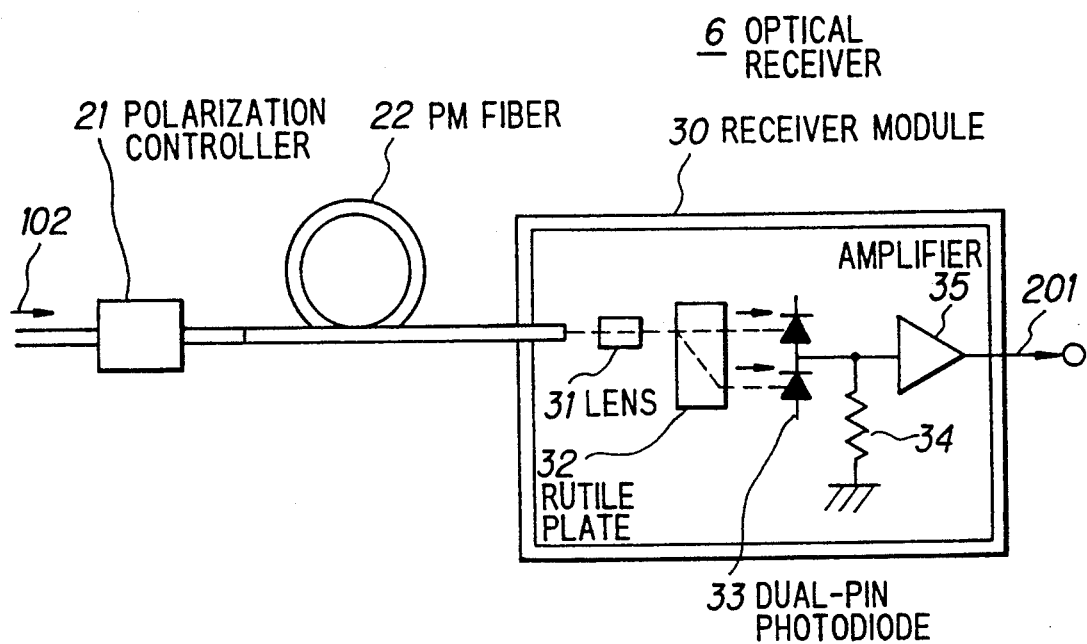
FIG. 5 is a block diagram showing an optical transmission system using an optical receiver of a second preferred embodiment according to the invention.

FIG. 5 shows an optical receiver 6 of a second preferred embodiment according to the invention. The optical receiver 6 includes a polarization controller 21 to which a transmission signal is supplied, a PM fiber 22 connected to the polarization controller 21, and a receiver module 30 connected to the PM fiber 22.

The receiver module 30 is of a balance type optical receiver. That is, the receiver module 30 includes a lens 31 to which a signal light is supplied from the PM fiber 22, a rutile plate 32 functioning as a polarization divider, a dual-pin photodiode 33 composed of two optical detectors which are integrated by connecting them in series, a resistor 34, and an amplifier 35 connected to the intermediate point of the dual-pin photodiode 33.

According to the second preferred embodiment, the optical receiver 6 can be fabricated to be small in size.

FIG. 6 shows an optical transmission system of a third preferred embodiment according to the invention. The optical transmission system, which is for an optical PSK (phase shift keying) method, includes an optical transmitter 4 and an optical receiver 5 of a direct detection type.

The optical transmitter 4 includes a bias current source 41, a semiconductor laser 42, and a phase modulator 43 of lithium niobate (LinO₃). In the transmitter 4, the phase modulator 43 modulates injection current in a range of zero to $\pi$ in accordance with a digital signal 401 to generate a PSK signal light 402 having a wavelength of 1.55 μm. The PSK signal light 402 is transmitted through an optical fiber 3 to the optical receiver 5.

The optical receiver 5 includes a polarization controller 51, a bias current source 59, an excitation light source 60 driven by the bias current source 59, a wavelength multiplexing coupler 61 connected to the polarization controller 51, an optical isolator 62 connected to the wavelength multiplexing coupler 61, an erbium-doped PM fiber 52 connected to the optical isolator 62, an optical isolator 63 connected to the erbium-doped PM fiber 52, an optical filter 64 connected to the optical isolator 63, a polarization divider 53 connected to the optical filter 64, two optical detectors 54 and 55 connected to the polarization divider 53, a differential amplifier 56 connected to the optical detectors 54 and 55, a peak detector 57 connected to an output of the differential amplifier 56, and a controller 58 connected at an input to the peak detector 57 and at an output to the polarization controller 51.

The erbium-doped PM fiber 52 is specified to have a length of approximately 133 m to provide a total propagation delay-time difference "$\tau$" of 400 ps. The excitation light source 60 generates an excitation light having a wavelength of 1.48 μm by the bias current supplied from the bias current source 59. The polarization divider 53 is determined to have an optical axis having forty five degrees to the two intrinsic optical anises of the erbium-doped PM fiber 52.

In the optical receiver 5, the PSK signal light 402 having a wavelength of 1.55 μm transmitted from the optical transmitter 4 is coupled with an excitation light having a wavelength of 1.48 μm at the wavelength multiplexing coupler 61. The coupled signal is supplied through the optical isolator 62 to the erbium-doped PM fiber 52. When the coupled signal is supplied to the erbium-doped PM fiber 52, erbium doped thereinto is excited by the excitation light having a wavelength of 1.48 μm, and the PSK signal light having a wavelength of 1.55 μm is amplified.

Next, when an output light of the erbium-doped PM fiber 52 is supplied through the optical isolator 63 to the optical filter 64, only the PSK signal light passes therethrough and is supplied to the polarization divider 53. After that, the optical receiver operates in the same manner as the first preferred embodiment shown in FIG. 1.

According to the third preferred embodiment, receiving sensitivity of the optical receiver 5 is increased relative to that of the first preferred embodiment shown in FIG. 1 by 10 dB.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching herein set forth.

For example, a polarization controller is not limited to the polarization controller 21 of optical fiber type. That is, any device can be used as a polarization controller as long as the device can control a polarization condition of a transmitted light, such as a waveguide type controller, a wavelength plate rotation type controller or the like. Further, the erbium-doped PM fiber 52 can be excited by an excitation light supplied from not only front side but also back side.

What is claimed is:

1. An optical receiver of direct detection type, comprising:
    a polarization controller for controlling polarizations of an input signal light modulated by an optical FSK (frequency shift keying) method;
    a PM (polarization-maintaining) fiber for discriminating a frequency of an output light of said polarization controller;
    a polarization divider for dividing an output light of said PM fiber into two orthogonal lights in polarization, said polarization divider being structured to have an optical axis having forty five degrees to the two intrinsic optical axes of said output light of said PM fiber;
    means for demodulating at least one of two output lights of said polarization divider to provide said signal light;
    means for detecting amplitude of said demodulated signal light; and
    a controller for controlling said polarization controller in accordance with an output of said amplitude detecting means so that said output of said amplitude detecting means is controlled to have maximum value.

2. An optical receiver of direct detection type, according to claim 1, wherein:
    said demodulating means comprises two photo detector for detecting said two output signals of said polarization divider, and a differential amplifier for amplifying a difference value between outputs of said photo detectors.

3. An optical receiver of direct detection type, according to claim 1, wherein:
    said amplitude detecting means comprises a diode, a resistor and a capacitor in parallel connected between an output line of said diode and ground.

4. An optical receiver of direct detection type, according to claim 1, wherein:

said polarization divider and said demodulating means are formed as an optical receiver module, said optical receiver module composed of a lens to which said output light of said PM fiber is supplied, a rutile plate for dividing an output light of said lens into two polarized lights, a dual-pin photodiode which is composed of two photo detectors connected in series for detecting said two output lights of said rutile plate, respectively, and an amplifier for amplifying an intermediate voltage between said two photodiodes.

5. An optical receiver of direct detection type, comprising:

a polarization controller for controlling polarizations of an input signal light modulated by an optical PSK (phase shift keying) method;

a PM (polarization-maintaining) fiber for discriminating a frequency of an output light of said polarization controller;

a polarization divider for dividing an output light of said PM fiber into two orthogonal lights in polarization, said polarization divider being structured to have an optical axis having forty five degrees to the two intrinsic optical axes of said output light of said PM fiber;

means for demodulating at least one of two output lights of said polarization divider to provide said signal light;

means for detecting an amplitude of said demodulated signal light; and a controller for controlling said polarization controller in accordance with an output of said amplitude detecting means so that said output of said amplitude detecting means is controlled to have maximum value.

6. An optical receiver of direct detection type, comprising:

a polarization controller for controlling polarizations of an input signal light modulated by an optical PSK (phase shift keying) method;

means for coupling an output light of said polarization controller with an excitation light;

a PM (polarization-maintaining) fiber for discriminating a phase of an output light of said coupling means, said PM fiber being of rare-earth element doped type for amplifying an input light in accordance with said excitation light;

a polarization divider for dividing an output light of said PM fiber into two orthogonal lights in polarization, said polarization divider being structured to have an optical axis having forty five degrees to the two intrinsic optical axes of said output signal of said PM fiber;

means for demodulating said signal light at least one of two output lights of said polarization divider to provide said signal light;

means for detecting an amplitude of said demodulated signal light; and a controller for controlling said polarization controller in accordance with an output of said amplitude detecting means so that said output of said amplitude detecting means is controlled to have maximum value.

7. An optical receiver of direct detection type, according to claim 6, wherein:

said rare-earth element is erbium.

8. An optical receiver of direct detection type, according to claim 6, wherein:

said coupling means is a wavelength multiplexing coupler.

9. An optical receiver of direct detection type, comprising:

a polarization controller for controlling polarizations of an input signal light modulated by an optical FSK (frequency shift keying) method;

means for coupling an output light of said polarization controller with an excitation light;

a PM (polarization-maintaining) fiber for discriminating a phase of an output light of said coupling means, said PM fiber being of rare-earth element doped type for amplifying an input light in accordance with said excitation light;

a polarization divider for dividing an output light of said PM fiber into two orthogonal lights in polarization, said polarization divider being structured to have an optical axis having forty five degrees to the two intrinsic optical axes of said output signal of said PM fiber;

means for demodulating said signal light at least one of two output lights of said polarization divider to provide said signal light;

means for detecting an amplitude of said demodulated signal light; and a controller for controlling said polarization controller in accordance with an output of said amplitude detecting means so that said output of said amplitude detecting means is controlled to have maximum value.

* * * * *